(12) United States Patent
DeJong (10) Patent No.: US 10,073,649 B2
(45) Date of Patent: Sep. 11, 2018

(54) STORING METADATA

(71) Applicant: Hewlett Packard Enterprise Development LP, Houston, TX (US)

(72) Inventor: David Michael DeJong, Fremont, CA (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 0 days.

(21) Appl. No.: 15/305,286

(22) PCT Filed: Jul. 24, 2014

(86) PCT No.: PCT/US2014/048001
§ 371 (c)(1),
(2) Date: Oct. 19, 2016

(87) PCT Pub. No.: WO2016/014061
PCT Pub. Date: Jan. 28, 2016

(65) Prior Publication Data
US 2017/0046099 A1 Feb. 16, 2017

(51) Int. Cl.
*G06F 12/00* (2006.01)
*G06F 3/06* (2006.01)

(52) U.S. Cl.
CPC .......... *G06F 3/0647* (2013.01); *G06F 3/061* (2013.01); *G06F 3/064* (2013.01); *G06F 3/0619* (2013.01); *G06F 3/0656* (2013.01); *G06F 3/0659* (2013.01); *G06F 3/0685* (2013.01)

(58) Field of Classification Search
CPC ...... G06F 3/0647; G06F 3/061; G06F 3/0619; G06F 3/064; G06F 3/0656; G06F 3/0659; G06F 3/0685
See application file for complete search history.

(56) References Cited

U.S. PATENT DOCUMENTS

| | | | |
|---|---|---|---|
| 5,666,514 A * | 9/1997 | Cheriton | G06F 11/1407 711/141 |
| 6,732,124 B1 * | 5/2004 | Koseki | G06F 11/1435 |
| 7,693,864 B1 | 4/2010 | Pasupathy et al. | |
| 7,739,677 B1 | 6/2010 | Kekre et al. | |

(Continued)

FOREIGN PATENT DOCUMENTS

| | | |
|---|---|---|
| EP | 1840769 A1 | 10/2007 |
| WO | WO-2008136563 | 11/2008 |

OTHER PUBLICATIONS

Seltzer, Margo I., et al. "Journaling Versus Soft Updates: Asynchronous Meta-data Protection in File Systems." USENIX Annual Technical Conference, General Track. 2000.*

(Continued)

*Primary Examiner* — David Yi
*Assistant Examiner* — Francisco A Grullon
(74) *Attorney, Agent, or Firm* — International IP Law Group, PLLC (57) ABSTRACT

A method and a system for storing metadata. The method includes requesting an update of metadata from an external source. The method includes storing updated metadata to a fast storage medium using an update thread. The method further includes moving the updated metadata from the fast storage medium to a slow storage medium using a flush thread.

21 Claims, 5 Drawing Sheets

(56) References Cited

U.S. PATENT DOCUMENTS

| | | | |
|---|---|---|---|
| 7,779,218 B2 | 8/2010 | Fandel et al. | |
| 8,452,929 B2* | 5/2013 | Bennett | G06F 11/1441 |
| | | | 711/156 |
| 8,880,787 B1* | 11/2014 | Kimmel | G06F 12/0246 |
| | | | 711/103 |
| 2004/0015724 A1 | 1/2004 | Pham et al. | |
| 2009/0222596 A1* | 9/2009 | Flynn | G06F 3/061 |
| | | | 710/22 |
| 2011/0078682 A1* | 3/2011 | Doan | G06F 9/45537 |
| | | | 718/1 |
| 2012/0254120 A1 | 10/2012 | Fang et al. | |
| 2013/0243190 A1 | 9/2013 | Yang et al. | |
| 2018/0046664 A1* | 2/2018 | Nishikawa | G06F 17/30374 |

OTHER PUBLICATIONS

International Search Report and Written Opinion, PCT/US2014/048001, HP reference 83958314, dated Feb. 26, 2015, 12 pages.

Lu, M. et al., Efficient Metadata Update Techniques for Storage Systems, Research Paper, Aug. 2010, 221 pages.

\* cited by examiner

STORING METADATA

BACKGROUND

In order to store metadata for a cluster system, updates to the metadata are synced to a slow storage disk before notifying a user about the success of the accepted changes. The process of retaining and storing the metadata may result in a delay of several seconds on a heavily loaded clustered system. Moreover, in the event that the cluster system fails before the metadata can be retained and stored, the integrity of the metadata may be compromised and lost during transmission.

DESCRIPTION OF THE DRAWINGS

The advantages of the present techniques are better understood by referring to the following detailed description and the attached drawings, in which.

DETAILED DESCRIPTION OF SPECIFIC EXAMPLES

Metadata may be defined as data that describes other data, e.g., which provides underlying definitions or descriptions of the other data. By describing the contents and context of the other data, relevant information related to the other data is readily available to a user. For example, an image file may include metadata that describes date of creation, ownership, access permissions, among other information. To be useful, a file system should record and store the updates related to the metadata in a fast and reliable manner while maintaining the integrity of the updated metadata in the event of an unpredictable system failure, e.g., power failure.

A file system, including a number of external sources (e.g. a plurality of nodes), may communicate with a slow, non-volatile storage to request storage of updated metadata. The slow, non-volatile storage may store and protect the updates by sequencing disk writes. With this approach, each individual on-disk metadata must be atomic, thus, forcing the updates to be fully contained by a single disk. However, before the file system can initiate a reply of a successful update, all updates must be successfully synced to the single disk. Further, if the single disk is selected from among several disks, a time consuming process of examining all of the disks may be initiated to manually select the single disk. As a result, a delay, which may be as long as several seconds on a heavily loaded cluster system, may create a latency issue.

Examples described herein describe a method of storing metadata that includes storing updated metadata to a fast storage medium before storing to a slow storage medium. This method may overcome latency issues associated with the slow storage medium by initially storing metadata to the fast storage medium, while protecting the metadata against system failure events.

Figure 1:
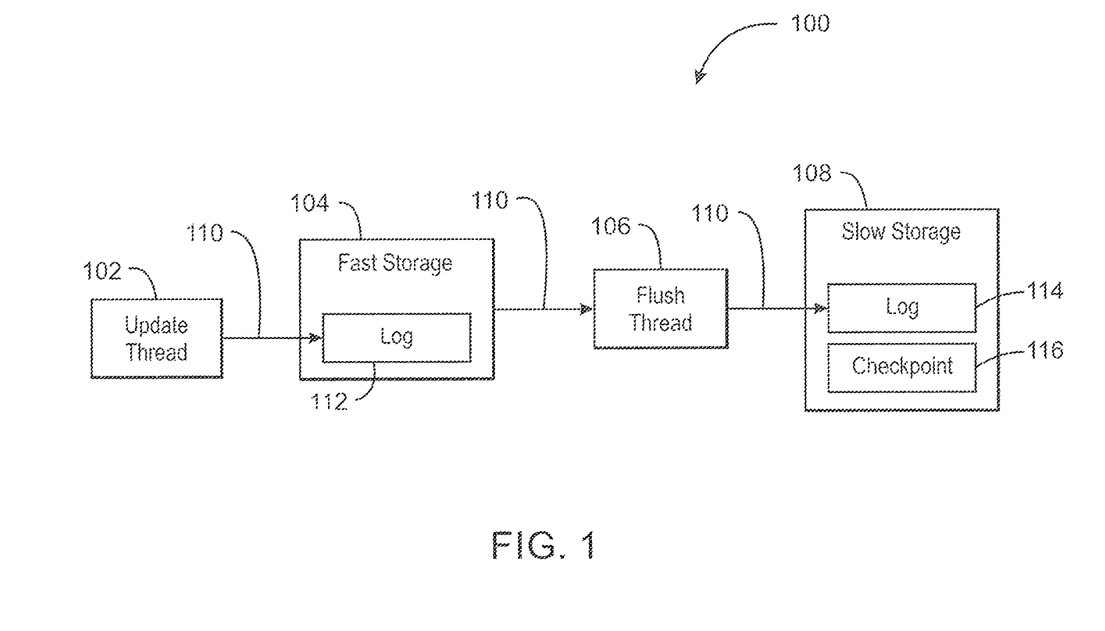
FIG. 1 is a schematic of a computing system that stores updated metadata in a circular buffer within a fast storage medium, when a memory location is available in the circular buffer.

FIG. 1 is a schematic of a computing system 100 that stores updated metadata in a circular buffer within a fast storage medium, when a memory location is available in the circular buffer. The computing system 100 may include an update thread 102, fast storage medium 104, a flush thread 106, and slow storage medium 108. The update thread 102 may be configured to communicate with an external source by receiving updates, determining the status of the updates, and storing the updates to the fast storage medium 104. The fast storage medium 104 may include random access memory (RAM), including dynamic random access memory (DRAM) and static random access memory (SRAM), and fast central processing unit (CPU) cache memory, among other volatile memory types. For example, updates related to the metadata may provide relevant information to a user by describing how, when, and by whom a particular set of data was collected, and how the data is formatted.

In examples described herein, the fast storage medium 104 may act as a holding place for the updated metadata 110, with little to no latency issues, before moving and storing it to the slow storage medium 108. The fast storage medium 104 includes memory that may need power to preserve the stored updated metadata 110. For example, if a device is switched to a powered-off position, the updated metadata 110 stored in the fast storage medium 104 may be lost.

The update thread 102 may initially determine if a memory location is available in the fast storage medium 104 to record the updates before generating and storing updated metadata 110 to that memory location. For example, if all memory locations in the circular buffer in the fast storage medium are currently filled with metadata that is waiting to be transferred to the slow storage medium, the update thread 102 may be blocked from storing the updates. This is discussed with respect to FIG. 2.

If a memory location exists, the update thread 102 may build up a log header, a log update header, and data for log updates to generate and to store the updated metadata 110. The log header may include a generation number of a log update, total size of a disk as used by the log update, and checkpoint generation numbers. The log update header may include a length of the log update and an offset as to the log update applied to the checkpoint generation numbers. A generation number may be defined as an increasing integer that updates by one each time the metadata is updated.

After the buildup of the updated metadata 110, it may be stored in the log area 112. In particular, the updated metadata 110 may be stored in a memory mirror of the log area 112. The log area 112 may be treated as a circular buffer so that existing metadata stored in the fast storage medium 104 may be overwritten by the updated metadata 110 when the log area 112 is full, assuming that the overwritten areas have been processed for storage.

Since the update thread 102 and the flush thread 106 may both attempt to access the updated metadata 110 simultaneously, a mutex may be utilized to protect against simultaneous access to the updated metadata 110. The mutex is a system object that allows multiple threads, e.g., update thread 102 and flush thread 106, to share the same resource, such as file access to the locations being used for the storage of the updated metadata 110, without allowing simultaneous access. For example, once the update thread 102 begins to store the updated metadata 110 to the fast storage medium 104, a mutex may be created and used by the update thread 102. The mutex may prevent the flush thread 106 from accessing the updated metadata 110 during processing. Thus, the update thread 102 may have exclusive use of the mutex until the updated metadata 110 is fully stored to the fast storage medium 104. Thereafter, the update thread 102 may release the mutex, allowing the flush thread 106 to have access to the updated metadata 110.

After storing the updated metadata 110 to the fast storage medium 104, the update thread 102 may provide a signal to the flush thread 106 indicating that more metadata is available. In some examples, the flush thread may determine the updated metadata 110 is available by noting that a flag is set in a register corresponding to the updated metadata 110. The flush thread 106 may be configured to receive, store, and write the updated metadata 110 to the slow storage medium 108. The slow storage medium 108 includes memory that is saved regardless of the status of the power source, e.g., power on or power off. Examples of slow storage mediums 108 include a hard disk drive, flash memory, magnetic disk, magnetic tape, among other non-volatile storage types.

As shown in FIG. 1, the slow storage medium 108 may include a log area 114 and a checkpoint area 116. Upon receiving the signal that the updated metadata 110 is available, the flush thread 106 may acquire the mutex and may determine the capacity of the log area 114 for storage of the updated metadata 110.

In the event that a memory location is available, the flush thread 106 may copy a region of the log area 114 into a temporary memory buffer in an effort to ensure that the updated metadata 110 does not overwrite existing metadata. The copied log area may include the updated metadata 110 starting at a generation immediately after the updated metadata 110 currently present on the slow storage medium 108 and ending with the latest update. The flush thread 106 may drop the mutex before writing the temporary memory buffer to a location in the log area 114 of the slow storage medium 108.

Both the fast storage medium 104 and the slow storage medium 108 may require two different areas, a header area and the log area 112, 114, which is previously discussed. The updated metadata 110 may be written to the header area and the log area 112, 114 in alternation such that the most recently written area is not overwritten. Thus, writing to the areas may not be synced since there may be multiple updates to the fast storage medium 104 in between multiple updates to the slow storage medium 108.

A latency issue for a read/write command may occur based on the time to initially log updates to the slow storage medium 108 and to receive an acknowledgment that the updated metadata has been written to the log area 114 of the slow storage medium 108. As discussed with respect to FIG. 1, the updated metadata 110 may be received and stored to the fast storage medium 104 before it is stored to the slow storage medium 108. Thus, a write command may be performed under a substantially reduced latency by utilizing the fast storage medium 104 to initially process and store the updated metadata.

Figure 2:
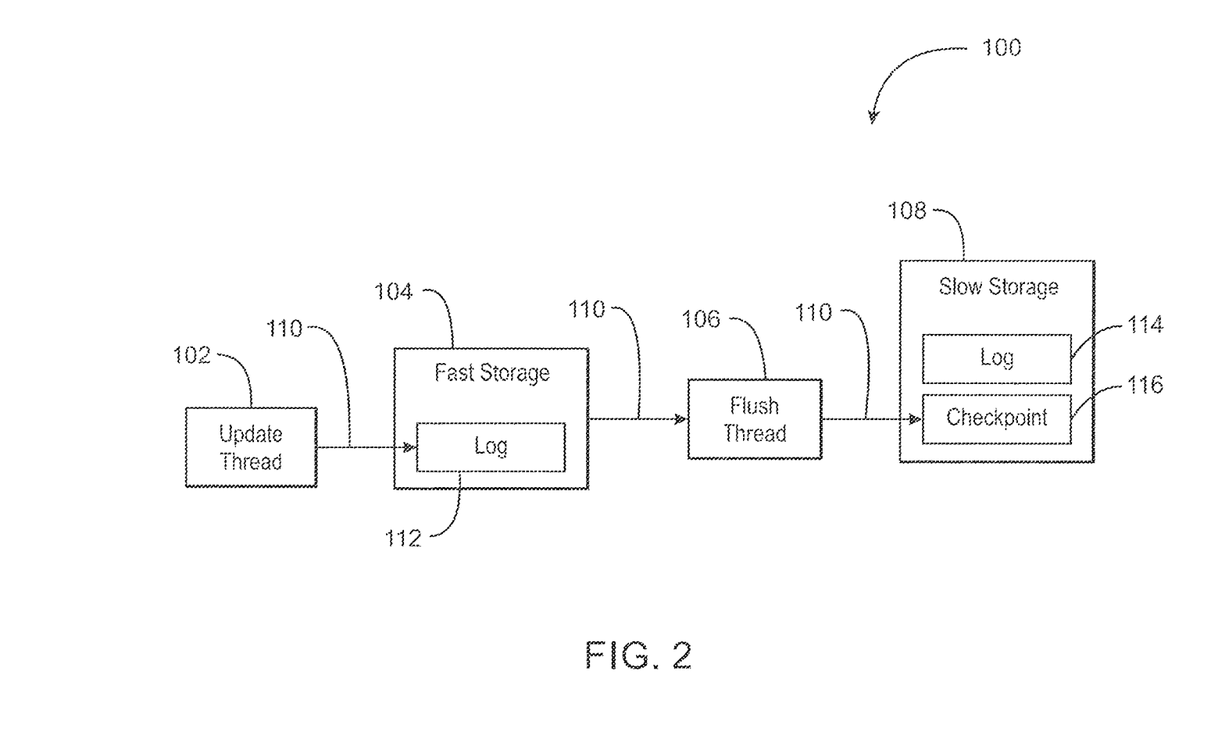
FIG. 2 is a schematic of a computing system that stores a checkpoint image within a checkpoint area of a slow storage medium, when a memory location is not available within a fast storage medium.

FIG. 2 is a schematic of a computing system 100 that stores a checkpoint image within a checkpoint area of a slow storage medium, when a memory location is not available within a fast storage medium. Like numbers are as described with respect to FIG. 1.

When the update thread 102 receives a pending update for metadata, it may determine if an available memory location exists in a log area 112 of a fast storage medium 104 to record the updated metadata 110. If the update thread 102 determines that a memory location is not available in the log area 112, the update thread 102 may release a mutex, which prevents access to the updated metadata 110. The flush thread 106 may acquire the mutex and may store the current set of updated metadata 110, as a single image block, into a checkpoint area 116 located in a slow storage medium 108.

The checkpoint area 116 may include a header that describes a checkpoint, e.g., description of the updated metadata written to the checkpoint area and the actual updated metadata stored in the checkpoint area. The header may contain a generation number of the checkpoint, the size used on a disk by the checkpoint, and the size of an uncompressed checkpoint.

Before actually storing the updated metadata 110 in the checkpoint area 116, the data may be compacted. The compaction includes scanning the checkpoint area 116 for areas marked to be skipped in order to remove data from that particular area and moving any data following the areas to be skipped back to eliminate empty regions. This process may remove any fragmentation within the updated metadata 110 and allow the flush thread 106 to keep track of both old and new positions of the updated metadata 110. The aforementioned checkpoint header and the compressed updated metadata 110 may be moved into a separate buffer. At that time, the mutex held by the flush thread 106 may be released and the flush thread 106 may write the separate buffer, which includes the updated metadata 110, to the checkpoint area 116 on the slow storage medium 108 to complete the process.

During the write to the checkpoint area 116, the update thread 102 may receive new updated metadata that may include an offset to be applied against an old checkpoint and an offset to be applied against a new checkpoint. The offset may be defined as the total size of the metadata and may be represented by a number ranging from zero to length-1, where the length refers to the total size of the metadata. This option allows for the log update to be reapplied against either checkpoint. If no new updated metadata is received during the write to the checkpoint area 116, a new log update may be automatically created that does not change the stored updated metadata. The new log update may simply reflect that the old checkpoint is not needed.

After storing the updated metadata to the checkpoint area 116 in the slow storage medium 108, a re-read may occur in order to move the updated metadata back into the fast storage medium 104. There may be two re-read processes, i.e., first process and second process, that may be used to re-read the updated metadata 110 back into either the log area 112 of the fast storage medium 104 or the log area 114 of the slow storage medium 108.

Since the second process may only be free of data loss if a clean shutdown occurs with all data flushed, it may be only used when an entire cluster is cleanly rebooted or if the fast storage medium 104 is lost on all nodes. In all other cases, the first process may be utilized. The first process may include using the log area 112 from the fast storage medium 104 and the checkpoint area 116 from the slow storage 108. The second process may include using the log area 114 and the checkpoint area 116 from the slow storage 108.

Regardless of the process used, the re-read process may begin by reading the updated metadata 110 related to the most recent update from either the fast storage medium 104 or slow storage medium 108. This may depend on whether the log area 112 of the fast storage medium 104 or the log area 114 of the slow storage medium 108 was previously used. The updated metadata 110 from the checkpoint area 116 may be uncompressed and a compression algorithm may be used to verify whether the write to the checkpoint 116 was completed and non-corrupted. If a checkpoint of a particular drive is not valid, the compression algorithm may continue to check until a valid checkpoint is found. Once a valid checkpoint is in a storage medium, the log area from the storage medium may be read into a buffer, where a first log header may be parsed in the buffer using a recorded start offset. If the generation of the log header is greater than the generation of the checkpoint, the log updates described by the log header may be applied using the offsets from the log update headers.

The re-read process may then proceed to a second log header where the aforementioned steps may be repeated. The re-read process may be considered complete when the log header for the generation recorded at the most recent updated is replayed. Upon completion, there may be uncertainty as to the state of the slow storage medium 108. To ensure a consistent slow storage medium 108, the re-read process may begin an immediate checkpoint of the updated metadata 110 until the re-read process proceeds until completion of the checkpoint.

Figure 3:
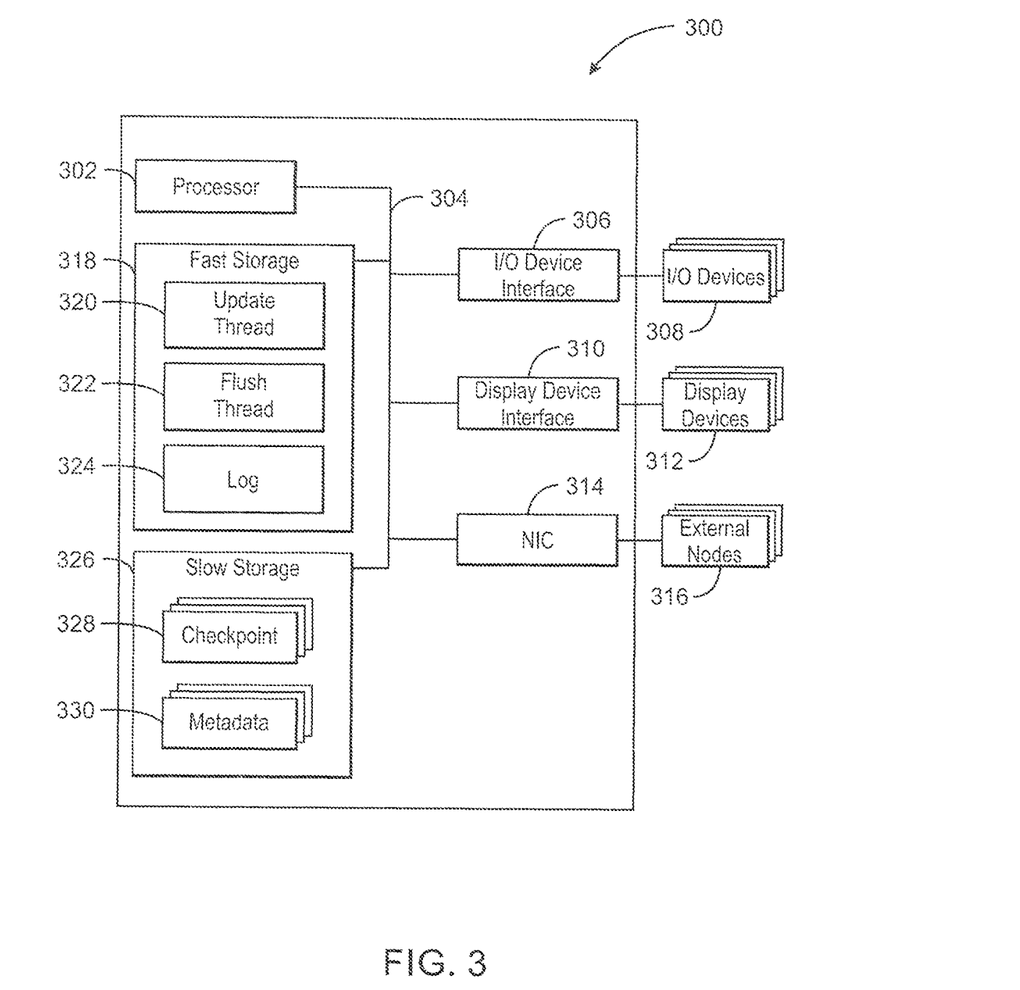
FIG. 3 is a block diagram of a computing system configured for storing metadata.

FIG. 3 is a block diagram of a computing system 300 configured for storing metadata. The computing system 300 may include, for example, a server computer or a desktop computer, among others. In some embodiments, the computing system 300 may include a cluster system made up of a number of such devices, where each device may leave or rejoin the cluster system.

The computing system 300 may include a processor 302 that is adapted to execute stored instructions. The processor 302 can be a single core processor, a multi-core processor, a computing cluster, or any number of other appropriate configurations.

The processor 302 may be connected through a system bus 304, e.g., AMBA®, PCI®, PCI Express®, Hyper Transport®, Serial ATA, among others, to an input/output (I/O) device interface 306 adapted to connect the computing system 300 to one or more I/O devices 308. The I/O devices 308 may include, for example, a keyboard and a pointing device, wherein the pointing device may include a touchpad or a touchscreen, among others. The I/O devices 308 may be built-in components of the computing system 300, or may be devices that are externally connected to the computing system 300.

The processor 302 may be linked through the system bus 304 to a display device interface 310 adapted to connect the computing system 300 to display devices 312. The display devices 312 may include a display screen that is a built-in component of the computing system 300. The display devices 312 may also include computer monitors, televisions, or projectors, among others, that are externally connected to the computing system 300.

The processor 302 may be linked through the system bus 304 to a network interface controller (NIC) 314 adapted to connect the computing system 300 to a computer network including external nodes 316. The external nodes 316 may include computers, storage devices, servers, switches, routers, among others, that are externally connected to the computing system 300.

The processor 302 may also be linked through the system bus 304 to a memory device, e.g., fast storage medium 318. In some examples, the fast storage medium 318 can include random access memory, e.g., SRAM, DRAM, eDRAM, EDO RAM, DDR RAM, RRAM®, PRAM, among others. The fast storage medium 318 may contain an update thread 320, a flush thread 322, and a log area 324. The update thread 318 may embody software configured to communication with the external nodes 316 to receive an update request related to metadata and to implement storage of the updated metadata.

The log area 324 may be treated as a circular buffer for storing the updated metadata processed by the update thread 320. In particular, the log area 324 may include a fixed size of allocated memory that can be used to store the updated metadata. Thus, instead of allocating more memory, new metadata may overwrite existing metadata so that the fast storage medium 318 may be able to handle numerous updates within a particular time-frame, e.g., 50 to 100 nanoseconds (ns). Thus, storing the updated metadata to the fast storage medium 318 may result in little to no latency issues. The flush thread 322 may include software configured to move the updated metadata from the log area 324 to a slow storage medium 326.

The processor 302 may be linked through the system bus 304 to the slow storage medium 326. The slow storage medium 326 may be configured to receive the updated metadata from the flush thread 322 and to read and store the metadata for long-term persistent storage. The slow storage medium 326 may store the updated metadata in a checkpoint area 328 or a log area 330.

The checkpoint area 328 may contain a full description of all of the data at a given point in time. The log area 330 may describe the modifications made to the checkpoint area 328. To retrieve the most recent updated metadata, a user may access the checkpoint area 328. Thereafter, the user may retrieve updated metadata from either the log area 324 of the fast storage medium 318 or the log area 330 of the slow storage medium 326.

Figure 4:
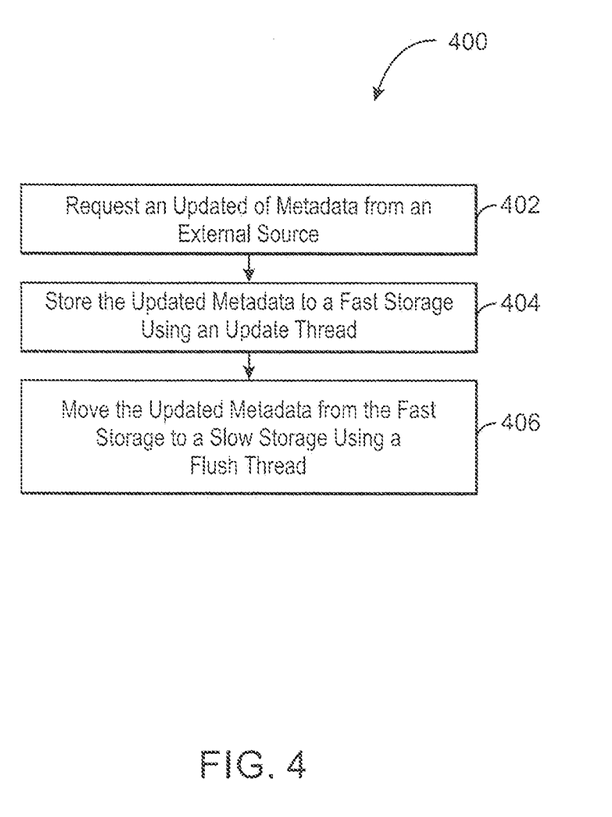
FIG. 4 is a method of storing metadata.

FIG. 4 is a method 400 of storing metadata. The method 400 provides a low latency storage process by initially storing metadata to a fast, volatile storage and subsequently storing and writing the metadata to a slow, non-volatile storage. At block 402, a request for an update to metadata from an external source is received by an update thread, which may result in the generation of updated metadata.

At block 404, the updated metadata is stored to a fast storage medium using the update thread. The fast storage medium may include volatile memory with little to no latency issues as the updated metadata can be quickly stored, for example, within 50 to 100 nanoseconds. The updated metadata to be stored can be treated as an arbitrary section of data where several operations may be conducted on the updated metadata. For example, new updated metadata may be added to the end of the existing metadata, an existing segment of the existing metadata may be modified, and a segment of the existing metadata may be removed by modifying it such that it will be skipped during parsing of the metadata. At block 406, a flush thread moves the updated metadata from the fast storage medium to the slow storage medium for permanent storage.

Figure 5:
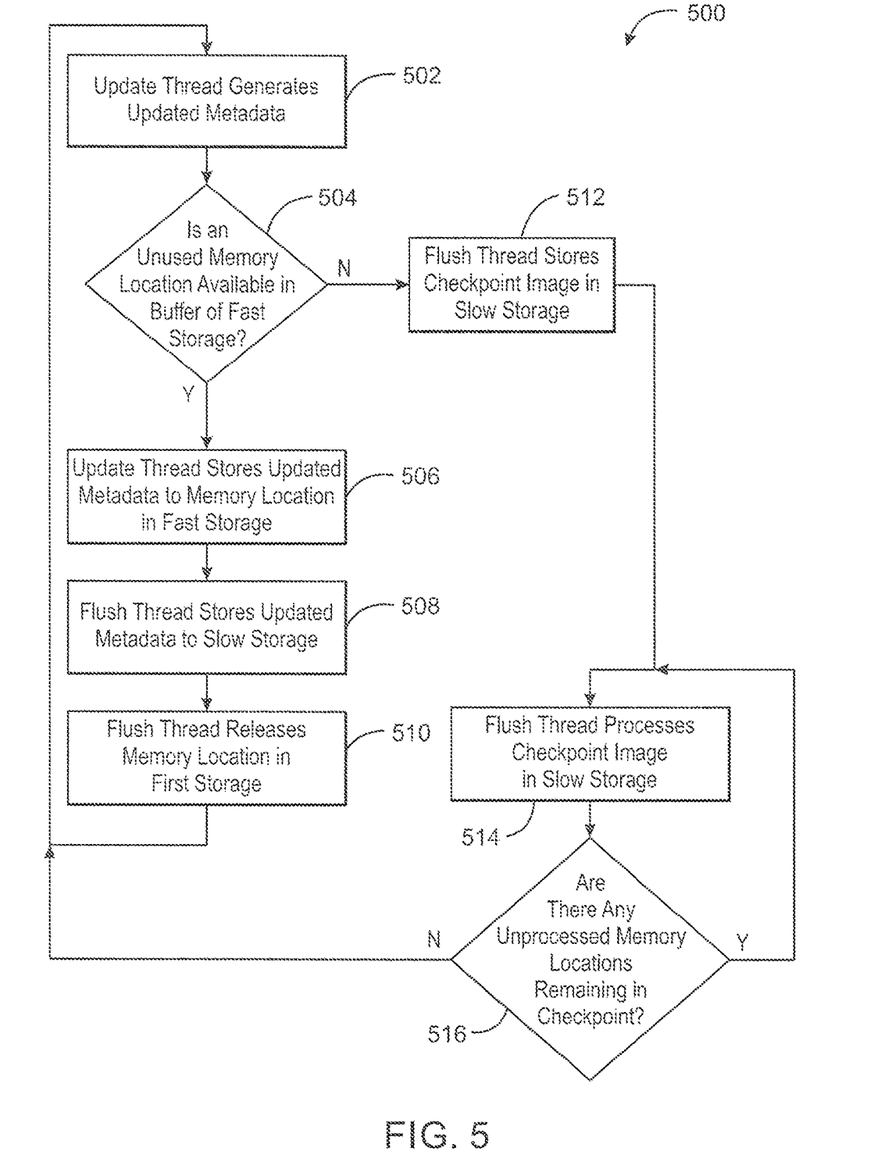
FIG. 5 is a flow diagram including procedural steps to store metadata.

FIG. 5 is a flow diagram 500 including process steps to store metadata. At block 502, updates may be sent to an update thread, which may generate updated metadata. The update thread may choose to store the updated metadata in a memory location of a buffer in a fast storage medium. At block 504, before storing the updated metadata, the update thread may determine if a memory location of a buffer is available in the fast storage medium. If a memory location of the buffer is available, at block 506, the update thread may store the updated metadata to the memory location of the buffer in the fast storage medium. The storage of the updated metadata initially to the fast storage medium may facilitate an efficient process, with little to no latency issues, since volatile memory is initially used for storage, as oppose to non-volatile memory.

Once the update thread stores the updated metadata to the fast storage medium, it may signal a flush thread as to the availability of the updated metadata. At block 508, the flush thread moves the updated metadata to a slow storage medium. Thereafter, at block 510, the flush thread may release the memory location of the buffer of the fast storage medium and await additional updated metadata from the update thread. When the update thread receives additional updates, the process steps may restart, i.e., at block 502.

If an unused memory location of the buffer is not available in the fast storage medium (i.e., at block 504), the flush thread may obtain the updated metadata to create a checkpoint image and to store the checkpoint image in the slow storage medium, at block 512. Accordingly, at block 514, the flush thread may process the checkpoint image from the slow storage medium to generate the log files. At block 516, the process determines if there are any unprocessed memory locations remaining in a checkpoint file. If unprocessed memory locations are available, the process returns to block 514. If there are no unprocessed memory locations remaining in the checkpoint file, the process returns to block 502 where the update thread may generate updated metadata.

The method 500 described above may include additional steps not shown. For example, if a checkpoint has been stored in slow storage, the flush thread may copy the checkpoint data back to fast storage before processing the updates from fast storage. In some examples, not all of the steps shown may be needed. For example, the process shown in blocks 514 and 516 may not be used if the checkpoint data is moved from slow storage back to fast storage and processed from the fast storage.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

The invention claimed is:

1. A method of storing metadata, comprising:
    receiving a request to update metadata from an external source;
    determining, by an update thread executed in a system comprising a processor, whether an available memory location exists in a log area of a fast storage medium;
    in response to determining that the available memory location exists in the log area of the fast storage medium:
        storing updated metadata corresponding to the request to the log area of the fast storage medium using the update thread; and
        moving the updated metadata corresponding to the request from the fast storage medium to a slow storage medium using a flush thread; and
    in response to determining that the available memory location is not present in the log area of the fast storage medium, storing, by the flush thread, a current set of updated metadata in the log area of the fast storage medium as a checkpoint into a checkpoint area in the slow storage medium.

2. The method of claim 1, wherein the log area comprises a circular buffer, and the determining comprises determining whether the memory location exists in the circular buffer in the fast storage medium.

3. The method of claim 2, comprising storing the updated metadata corresponding to the request in the circular buffer in the fast storage medium in response to determining that the available memory location exists in the circular buffer.

4. The method of claim 1, comprising signaling an availability of the updated metadata corresponding to the request to the flush thread in response to completing the storing of the updated metadata corresponding to the request to the log area of the fast storage medium.

5. The method of claim 1, wherein the moving comprises storing the updated metadata corresponding to the request to a temporary memory buffer within the slow storage medium using the flush thread.

6. A storage system comprising
    a processor;
    a fast storage medium;
    a slow storage medium having an access latency greater than an access latency of the fast storage medium; and
    a computer-readable medium storing instructions executable on the processor to:
        receive updated metadata from a node,
        determine, by an update thread, whether an available memory location exists in a log area of the fast storage medium,
        in response to determining that the available memory location exists in the log area of the fast storage medium:
            store, by the update thread, the received updated metadata in the log area of the fast storage medium, and
            move, by a flush thread, the received updated metadata from the log area of the fast storage medium to the slow storage medium; and
        in response to determining that the available memory location is not present in the log area of the fast storage medium, store, by the flush thread, a current set of updated metadata in the log area of the fast storage medium as a checkpoint into a checkpoint area in the slow storage medium.

7. The storage system of claim 6, wherein the slow storage medium comprises a header area, the checkpoint area, and a log area.

8. The storage system of claim 7, wherein the header area includes a generation number of a log update, a total size of a disk used by the log update, and a checkpoint generation number.

9. The storage system of claim 7, wherein the checkpoint area comprises a header and compressed data.

10. The storage system of claim 7, wherein the log area is a circular buffer comprising a log header, a log update header, and data.

11. The storage system of claim 6, comprising a temporary memory buffer in the slow storage medium to accept the received updated metadata from the fast storage medium.

12. A non-transitory computer readable medium comprising code that upon execution causes a system to:
    receive updated metadata from a node;
    determine, by an update thread, whether an available memory location exists in a log area of a fast storage medium;
    in response to determining that the available memory location exists in the log area of the fast storage medium:

store, by the update thread, the received updated metadata in the log area of the fast storage medium; and move, by a flush thread, the received updated metadata from the log area of the fast storage medium to a slow storage medium; and in response to determining that the available memory location is not present in the log area of the fast storage medium, store, by the flush thread, a current set of updated metadata in the log area of the fast storage medium as a checkpoint into a checkpoint area in the slow storage medium.

13. The method of claim 1, further comprising:

after the storing of the current set of updated metadata as the checkpoint into the checkpoint area in the slow storage medium, reading the checkpoint comprising the current set of updated metadata from the checkpoint area back into the fast storage medium.

14. The method of claim 13, further comprising:

after reading the checkpoint from the checkpoint area back into the fast storage medium, applying a further metadata update to the checkpoint.

15. The method of claim 14, wherein the reading of the checkpoint from the checkpoint area back into the fast storage medium is performed by the flush thread.

16. The storage system of claim 6, wherein the instructions are executable on the processor to:

obtain, by the update thread, a mutex to provide the update thread with exclusive access of the received updated metadata while the update thread stores the received updated metadata in the log area of the fast storage medium;

in response to fully storing the received updated metadata in the log area of the fast storage medium, release, by the update thread, the mutex, wherein the moving of the received updated metadata from the log area of the fast storage medium to the slow storage medium is performed by the flush thread after the release of the mutex by the update thread.

17. The storage system of claim 6, wherein the instructions are executable on the processor to:

after the storing of the current set of updated metadata as the checkpoint into the checkpoint area in the slow storage medium, read the checkpoint comprising the current set of updated metadata from the checkpoint area back into the fast storage medium.

18. The storage system of claim 17, wherein the instructions are executable on the processor to:

after reading the checkpoint from the checkpoint area back into the fast storage medium, apply a further metadata update to the checkpoint.

19. The storage system of claim 6, wherein the current set of updated metadata that is stored as the checkpoint into the checkpoint area of the slow storage medium comprises the received updated metadata.

20. The non-transitory computer readable medium of claim 12, wherein the code upon execution causes the system to:

after the storing of the current set of updated metadata as the checkpoint into the checkpoint area in the slow storage medium, read the checkpoint comprising the current set of updated metadata from the checkpoint area back into the fast storage medium.

21. The non-transitory computer readable medium of claim 20, wherein the code upon execution causes the system to:

after reading the checkpoint from the checkpoint area back into the fast storage medium, apply a further metadata update to the checkpoint.

* * * * *